United States Patent
Takeishi

(10) Patent No.: US 7,903,288 B2
(45) Date of Patent: Mar. 8, 2011

(54) IMAGE PROCESSING APPARATUS CAPABLE OF IDENTIFYING LARGE DOT REGION AND SMALL DOT REGION

(75) Inventor: Hiroki Takeishi, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 706 days.

(21) Appl. No.: 11/947,675

(22) Filed: Nov. 29, 2007

(65) Prior Publication Data

US 2008/0151306 A1    Jun. 26, 2008

(30) Foreign Application Priority Data

Dec. 20, 2006 (JP) ................................ 2006-343431

(51) Int. Cl.
G06K 15/00 (2006.01)
G06K 9/00 (2006.01)
H04N 1/40 (2006.01)

(52) U.S. Cl. ......... 358/2.1; 358/3.24; 358/3.28; 382/100

(58) Field of Classification Search .................. None
See application file for complete search history.

(56) References Cited

U.S. PATENT DOCUMENTS

| 6,512,915 | B2 * | 1/2003 | Matsunoshita et al. ....... 399/366 |
| 7,499,196 | B2 * | 3/2009 | Nakata et al. ................. 358/2.1 |
| 2003/0179412 | A1 * | 9/2003 | Matsunoshita ............... 358/3.28 |
| 2004/0150859 | A1 * | 8/2004 | Hayashi ........................ 358/3.28 |
| 2005/0052682 | A1 * | 3/2005 | Ishikawa et al. ............. 358/1.14 |
| 2005/0078331 | A1 * | 4/2005 | Guan et al. ................... 358/1.14 |
| 2005/0190411 | A1 * | 9/2005 | Ohno ............................ 358/3.28 |
| 2005/0219634 | A1 * | 10/2005 | Murakami .................... 358/3.28 |
| 2007/0127055 | A1 * | 6/2007 | Kujirai et al. ................. 358/1.14 |
| 2008/0088862 | A1 * | 4/2008 | Harashima et al. ............ 358/1.9 |
| 2009/0136080 | A1 * | 5/2009 | Zandifar et al. ............. 382/100 |

FOREIGN PATENT DOCUMENTS

| EP | 1385327 A2 | 1/2004 |
| JP | 2004-228896 A | 8/2004 |
| JP | 2004-274092 A | 9/2004 |
| JP | 2004-350235 A | 12/2004 |
| JP | 2005-210376 A | 8/2005 |

\* cited by examiner

*Primary Examiner* — Twyler L Haskins
*Assistant Examiner* — Barbara D Reinier
(74) *Attorney, Agent, or Firm* — Canon USA, Inc. IP Division

(57) ABSTRACT

An image processing apparatus includes an identification unit configured to identify a large dot region, in which large dots consecutively exist, and a small dot region, in which small dots consecutively exist, in a read image obtained by reading an image on a sheet, a determination unit configured to determine whether a difference in degree of brightness between the large dot region and the small dot region identified by the identification unit is less than a threshold value, and a processing unit configured to disable printing using the read image if the determination unit determines that the difference is less than the threshold value, and to enable printing using the read image if the determination unit determines that the difference is equal to or greater than the threshold value.

9 Claims, 12 Drawing Sheets

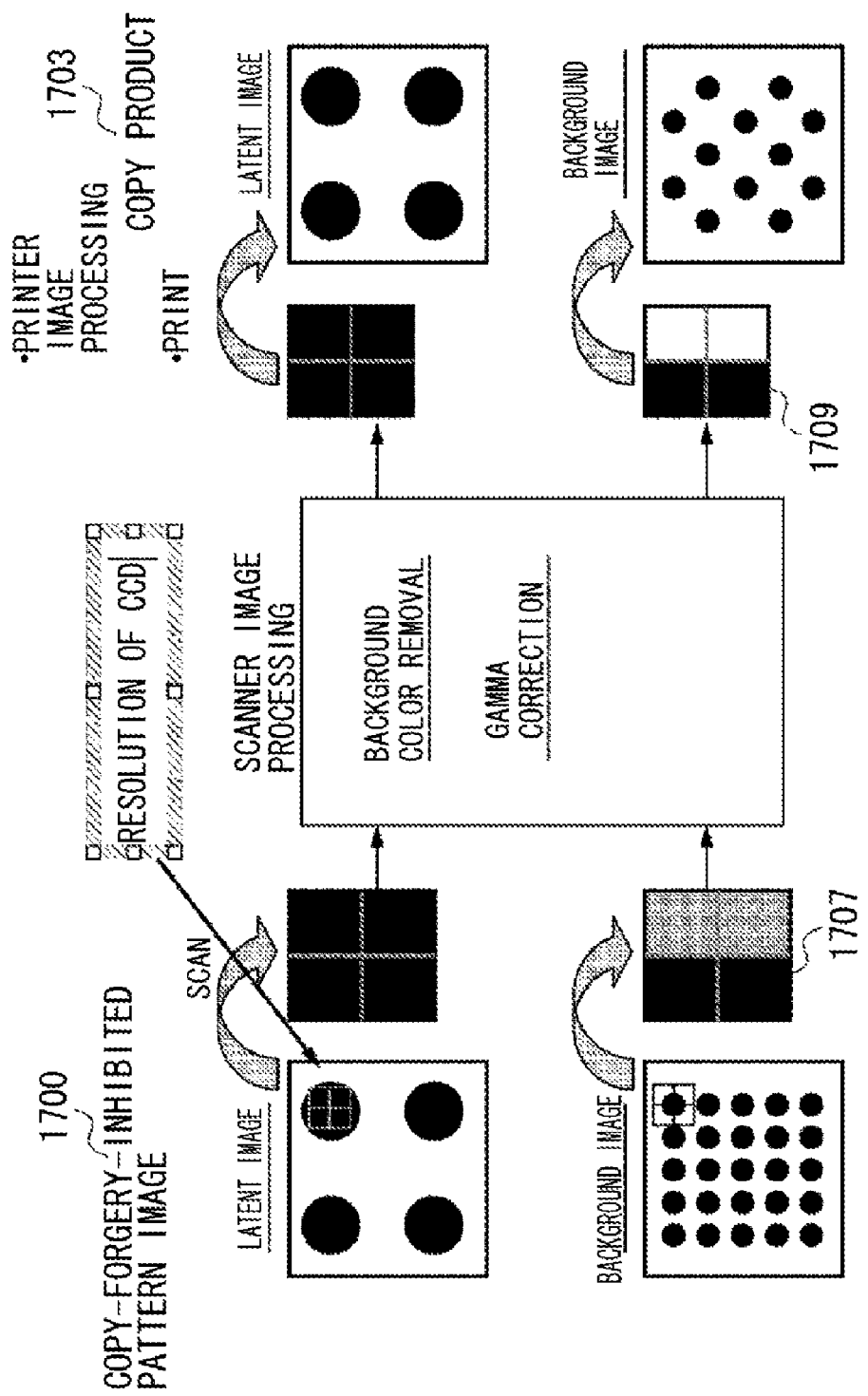

IMAGE PROCESSING APPARATUS CAPABLE OF IDENTIFYING LARGE DOT REGION AND SMALL DOT REGION

BACKGROUND OF THE INVENTION

1. Field of the Invention

The present invention relates to an image processing apparatus, such as a copying machine or a multifunction peripheral, capable of performing a scanning function and a printing function, and more particularly to an image processing apparatus which is capable of processing a scanned image and identifying a large dot region and a small dot region.

2. Description of the Related Art

Various techniques for printing copy-forgery-inhibited pattern images are known, one of which is discussed in Japanese Patent Application Laid-Open No. 2004-228896. Techniques for processing and printing copy-forgery-inhibited pattern images are described below.

Figure 1:
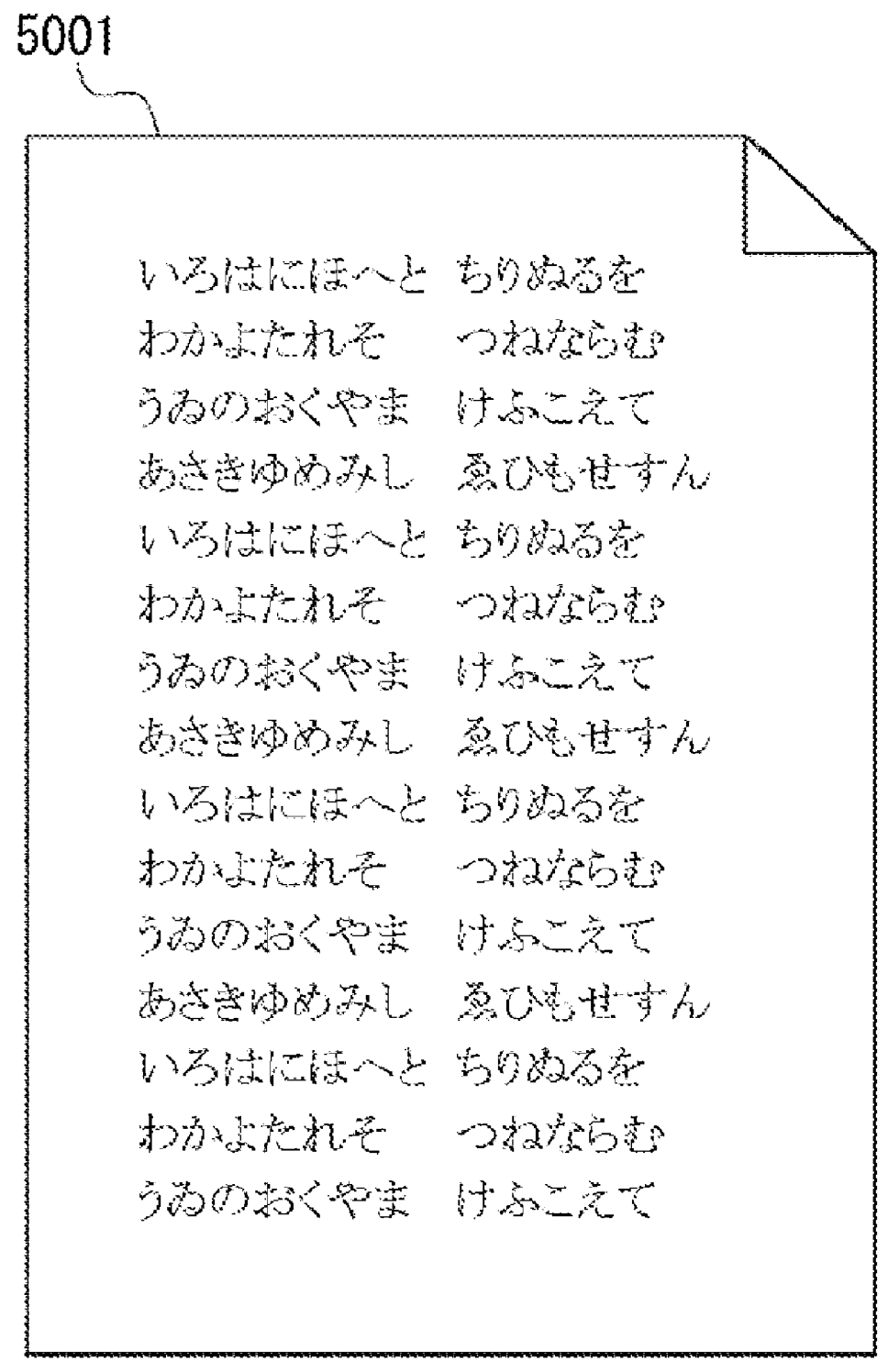

FIG. 1 illustrates an original image 5001. FIG. 2 illustrates that a print product 5010 can be obtained by printing a composite image that is generated by combining the original image 5001 with a copy-forgery-inhibited pattern image 5002.

When the print product 5010 is copied, a copy product 5001' illustrated in FIG. 4 is obtained. Thus, when the print product 5010 obtained by combining the original image 5001 with the copy-forgery-inhibited pattern image 5002 is copied, a latent image 4002, which has been hidden in the print product 5010, emerges on the copy product 5001'.

Thus, even when a print product obtained by combining an original image with a copy-forgery-inhibited pattern image is copied, users cannot obtain a copy product that is exactly the same as the print product. The copy-forgery-inhibited pattern image is directed to a technique for preventing a user from obtaining a copy product that is exactly the same as a print product.

Copy-forgery-inhibited pattern images employed to prevent a user from obtaining a copy product that is exactly the same as a print product are frequently used in a case where a print product (e.g., a copy of a residence card, or an insurance certificate), the assurance of authenticity of which is demanded, is produced.

Next, it is described below how a copy-forgery-inhibited pattern image is generated.

The copy-forgery-inhibited pattern image includes dot groups that differ in dot size from each another. An example of a copy-forgery-inhibited pattern image illustrated in FIG. 3 includes a small dot group 5002a and a large dot group 5002b. An image of a region, in which the large dot group 5002b is located, is referred to as a latent image. An image of a region, in which the small dot group 5002a is located, is referred to as a background image.

The small dot group and the large dot group are substantially equal in density per given area to each other on a print product. Therefore, even when a user glances the print product, the user cannot distinguish the latent image from the background image. Accordingly, the latent image is not seen to emerge from the background image.

On the other hand, as described above, when a copy-forgery-inhibited pattern image is copied, a latent image emerges from a background image. This is because of the fact that a copying machine has ability to exactly reproduce large dots on a print product, but it lacks ability to exactly reproduce small dots on the print document.

To explain this phenomenon in more detail, first, a configuration of a copying machine is described below.

As illustrated in FIG. 5, a copying machine 6000 includes an image reading device 6001. The image reading device 6001 (e.g., a scanner or a digital camera) reads a surface of a print product using an optical element 6002, typified by a charge coupled device (CCD), to generate a scan image as electrical signals. The scan image is sent to an image processing apparatus 6003. Then, the image processing apparatus 6003 performs scanner image processing on the scan image. In the context of the present specification, an image obtained by performing scanner image processing on the scan image is referred to as a read image. Subsequently, the image processing apparatus 6003 temporarily stores the read image in a storage unit 6005. Thereafter, the image processing apparatus 6003 reads the stored image and performs printer image processing on the read image. Then, the image processing apparatus 6003 outputs the processed image to a printer 6004. Finally, the printer 6004 receives the processed image and prints the processed image on a sheet.

FIG. 6 illustrates that when a copy-forgery-inhibited pattern image 1600 formed on a print product is copied by the copying machine 6000, a copy product 1603 is obtained.

A part of the latent image 1601 of the copy-forgery-inhibited pattern image 1600 is a large dot region. A part of the background image 1602 of the copy-forgery-inhibited pattern image 1600 is a small dot region. A size of each small dot is about 42 µm×42 µm (corresponding to 1 pixel at a resolution of 600 dpi (dots per inch)). A size of each large dot is about 126 µm×126 µm (corresponding to 3×3 pixels at a resolution of 600 dpi).

When such large dots are read by a CCD having a resolution of 600 dpi, an image 1606 in a state in which each pixel is dark (i.e., has a low luminance value) is generated. Conversely, when small dots are read by such a CCD, an image 1607 in a state in which each pixel is light (i.e., has a high luminance value) is generated.

When a scan image including the images 1606 and 1607 is sent to the image processing apparatus 6003, the image processing apparatus 6003 performs scanner image processing on the scan image. The scanner image processing includes a background color removal process, a logarithm conversion process, and a gamma correction process.

Among these processes, the background color removal process may be the most principal cause of a phenomenon that a latent image emerges from a background image on a copy product. The background color removal process aims to eliminate, for example, a light gray part of a surface of a sheet of newspaper and to convert a light color pixel into a white or lighter-color pixel.

A light-color image 1607 obtained by the CCD reading small dots is converted into a lighter-color image 1609 by the background color removal process. On the other hand, a dark image 1606 obtained by the CCD reading large dots remains as a dark image 1608.

That is a reason for the phenomenon that when an copy-forgery-inhibited pattern image is copied by a copying machine having a resolution of 600 dpi, a latent image emerges from a background on a copy product.

However, nowadays, image reading devices each including a CCD, whose resolution exceeds 600 dpi, have become increasingly popular. In a case where a copy-forgery-inhibited pattern image is read by such an image reading device, even when a background color removal process is performed on a background image thereafter, the probability of occurrence of a phenomenon in which the color of the background image becomes lighter or white decreases.

This phenomenon is explained below with reference to FIG. 7. FIG. 7 illustrates that when a copy-forgery-inhibited pattern image 1700 formed on a print product is copied, a copy product 1703 is obtained.

For the sake of explanation, suppose that the resolution of the CCD illustrated in FIG. 7 is 1200 dpi, which is twice that in the case illustrated in FIG. 6. Accordingly, when small dots are read by the CCD, an image 1707 is generated, in which a part of pixels of the image 1707 are dark (i.e., have low luminance values). Even when a background color removal process is performed on the image 1707 having such dark pixels, the dark pixels are not converted. That is, the dark pixels remain dark. Thus, an image 1709 is generated. Therefore, even when a copying process is performed on a copy-forgery-inhibited pattern image formed on a print product, the color of a background image does not become so light. Accordingly, a latent image may not emerge from the background image as intended.

Consequently, a copy product is formed such that the copy product may be nearly the same as the print product (i.e., an original) including a copy-forgery-inhibited pattern image. Accordingly, the copy product may be indistinguishable from the original.

SUMMARY OF THE INVENTION

An embodiment of the present invention is directed to an image processing apparatus capable of preventing a copy product, which may be mistaken for an original that includes a copy-forgery-inhibited pattern image, from being generated from an image obtained by reading the original.

According to an aspect of the present invention, an image processing apparatus includes an identification unit configured to identify a large dot region, in which large dots consecutively exist, and a small dot region, in which small dots consecutively exist, in a read image obtained by reading an image on a sheet, a determination unit configured to determine whether a difference in degree of brightness between the large dot region and the small dot region identified by the identification unit is less than a threshold value, and a processing unit configured to disable printing using the read image if the determination unit determines that the difference is less than the threshold value, and to enable printing using the read image if the determination unit determines that the difference is equal to or greater than the threshold value.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 illustrates an example of an original image.

FIG. 7 illustrates a process for obtaining a copy product by scanning a print product, which includes a copy-forgery-inhibited pattern image, with a CCD having a resolution of 1200 dpi.

DETAILED DESCRIPTION OF THE EMBODIMENTS

Various exemplary embodiments, features, and aspects of the invention will be described in detail below with reference to the drawings.

Hereinafter, a description is made on processing to be performed in a case where a scan image is sent from an image reading device to a processor (e.g., CPU) after a user presses a start button subsequently to placement of a print product on a document positioning plate of an image processing apparatus, such as a copying machine or a multifunction peripheral, with reference to FIG. 10.

Figure 10:
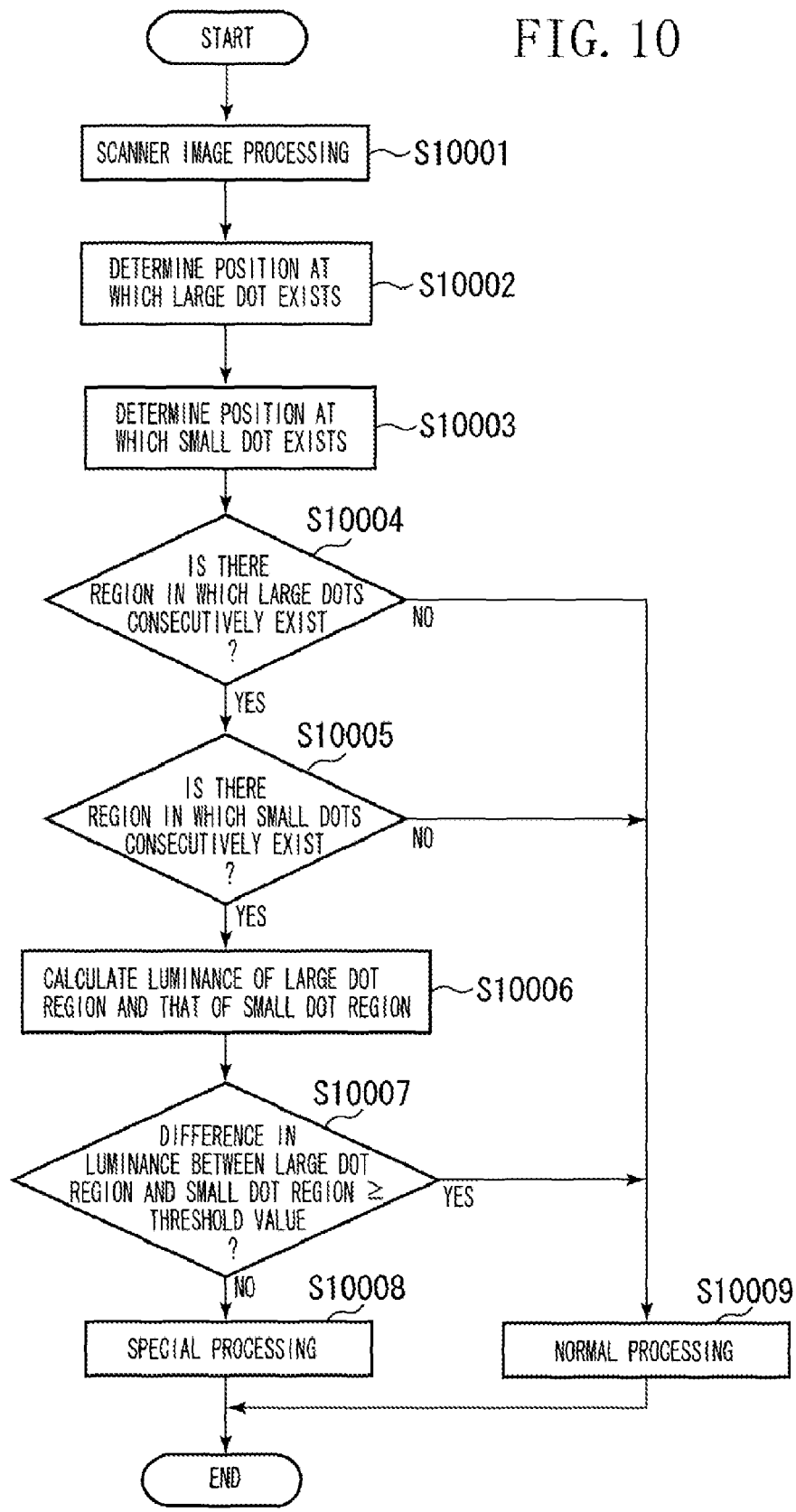
FIG. 10 is a flowchart illustrating a process for changing processing depending on a state of dots in a read image according to an exemplary embodiment of the present invention.

FIG. 10 illustrates a process implemented by an image processing apparatus in which a special processing is to be performed in a case where it is determined that a copy-forgery-inhibited pattern image exists on a print product, and where it is determined that latent image will not emerge on a copy product as intended. The present exemplary embodiment is described below by assuming that a color of the copy-forgery-inhibited pattern image is black (K). However, the color of the copy-forgery-inhibited pattern image is not limited to black (K). For example, any of cyan (C), magenta (M), and yellow (Y) can be employed as the color of the copy-forgery-inhibited pattern image.

In an embodiment, processing to be performed in each of operations illustrated in FIG. 10 is integratedly controlled by a central processing unit (CPU) in an image processing apparatus 6003.

When receiving a scan image from an image reading device 6001 whose resolution is 1200 dpi, the image processing apparatus 6003 starts the following processing in step S10001.

In step S10001, the image processing apparatus 6003 performs scanner image processing on the received scan image. The scanner image processing includes a background color removal process, as described above. Hereinafter, an image obtained by performing scanner image processing on a scan image is referred to as a read image. In an implementation, the read image is a red-green-blue (RGB) image. However, the read image can also be a black and white image.

In step S10002, the image processing apparatus 6003 determines a position at which each large dot exists in the read image. The determination of such a position can be performed according to a luminance value of each pixel that exists in the read image.

More specifically, in step S10002, the image processing apparatus 6003 determines a central position of a region of 3×3 pixels as a position of each large dot in a case where the region of 3×3 pixels is very dark and where an area outside a region of 7×7 pixels concentric with the region of 3×3 pixels is very light. This is because of the facts that generally, each of large dots of a copy-forgery-inhibited pattern image is formed on a print product to have a size of 3×3 pixels or so at a resolution of 600 dpi (i.e., a size of 6×6 pixels or so at a resolution of 1200 dpi), and that in a case where a dot having a size of 6×6 pixels is scanned, generally, a region of 3×3 pixels is recognized to be very dark, while an area outside a concentric region of 7×7 pixels is recognized to be very light.

Figure 2:
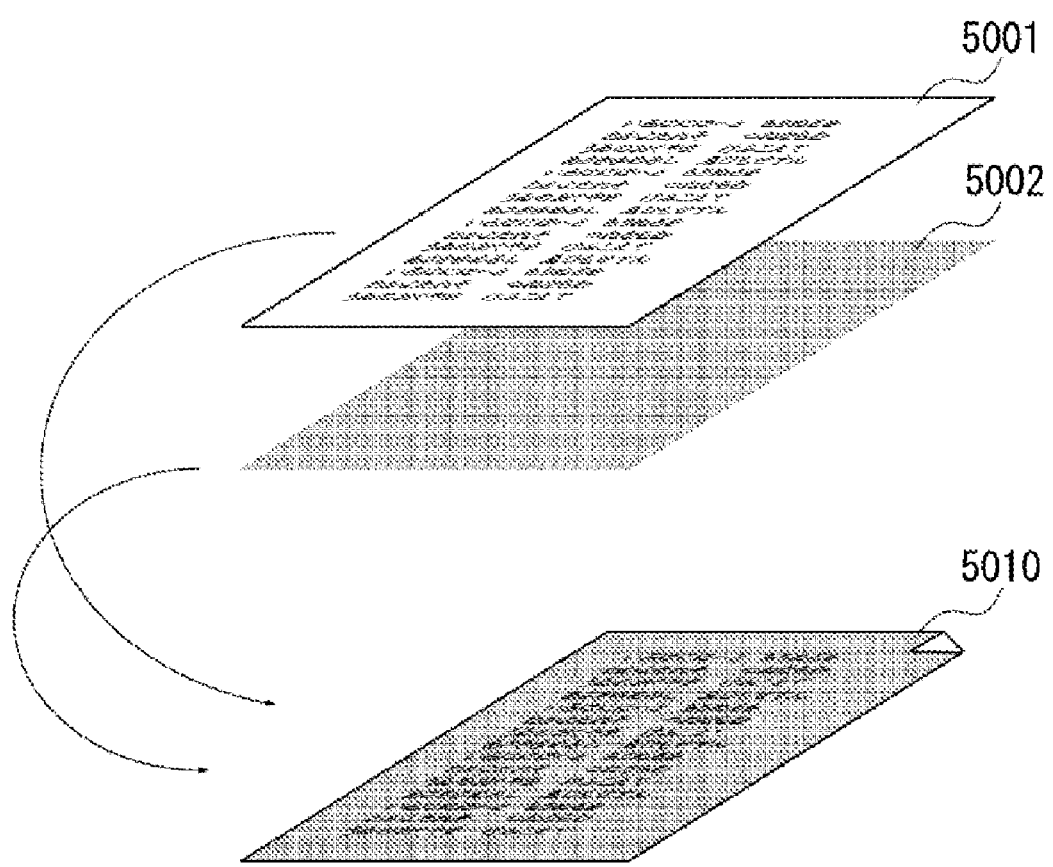
FIG. 2 illustrates that a composite image is generated by combining an original image with a copy-forgery-inhibited pattern image.
Figure 3:
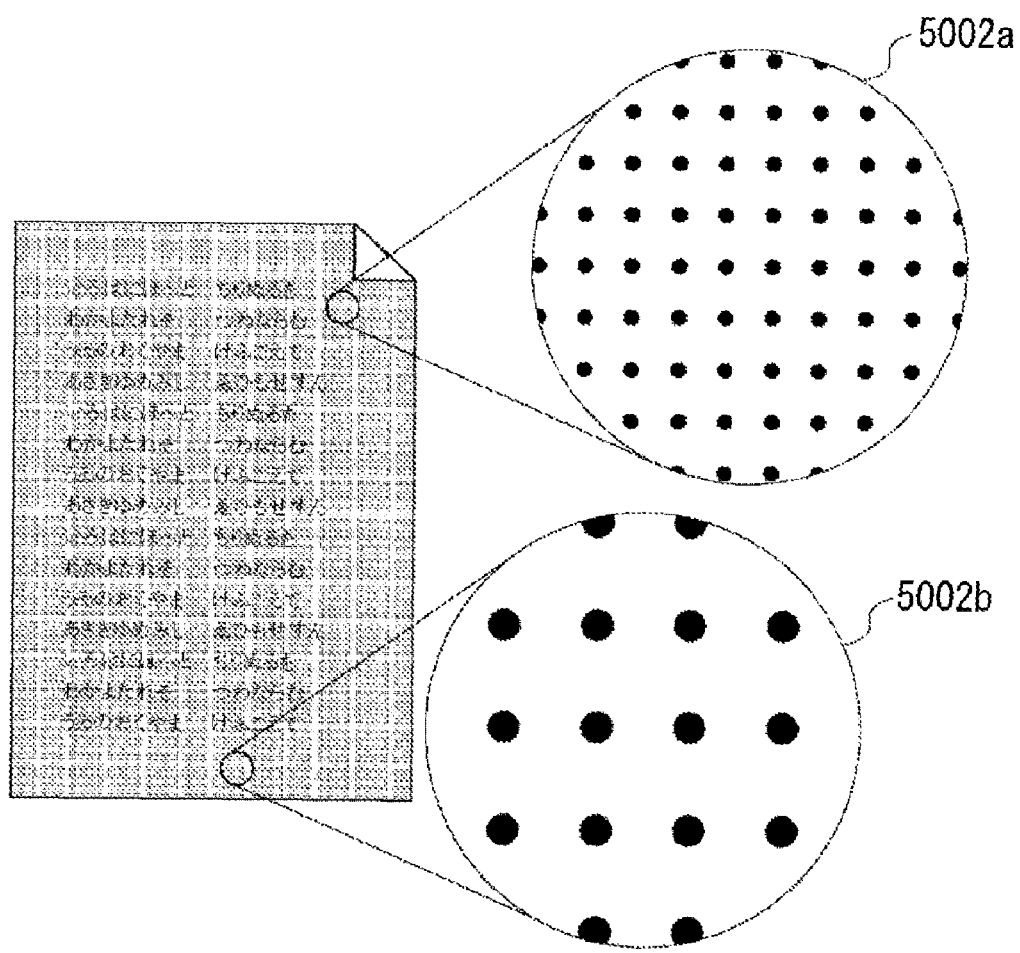
FIG. 3 illustrates dot groups that are included in the copy-forgery-inhibited pattern image and that differ in dot size from each other.
Figure 4:
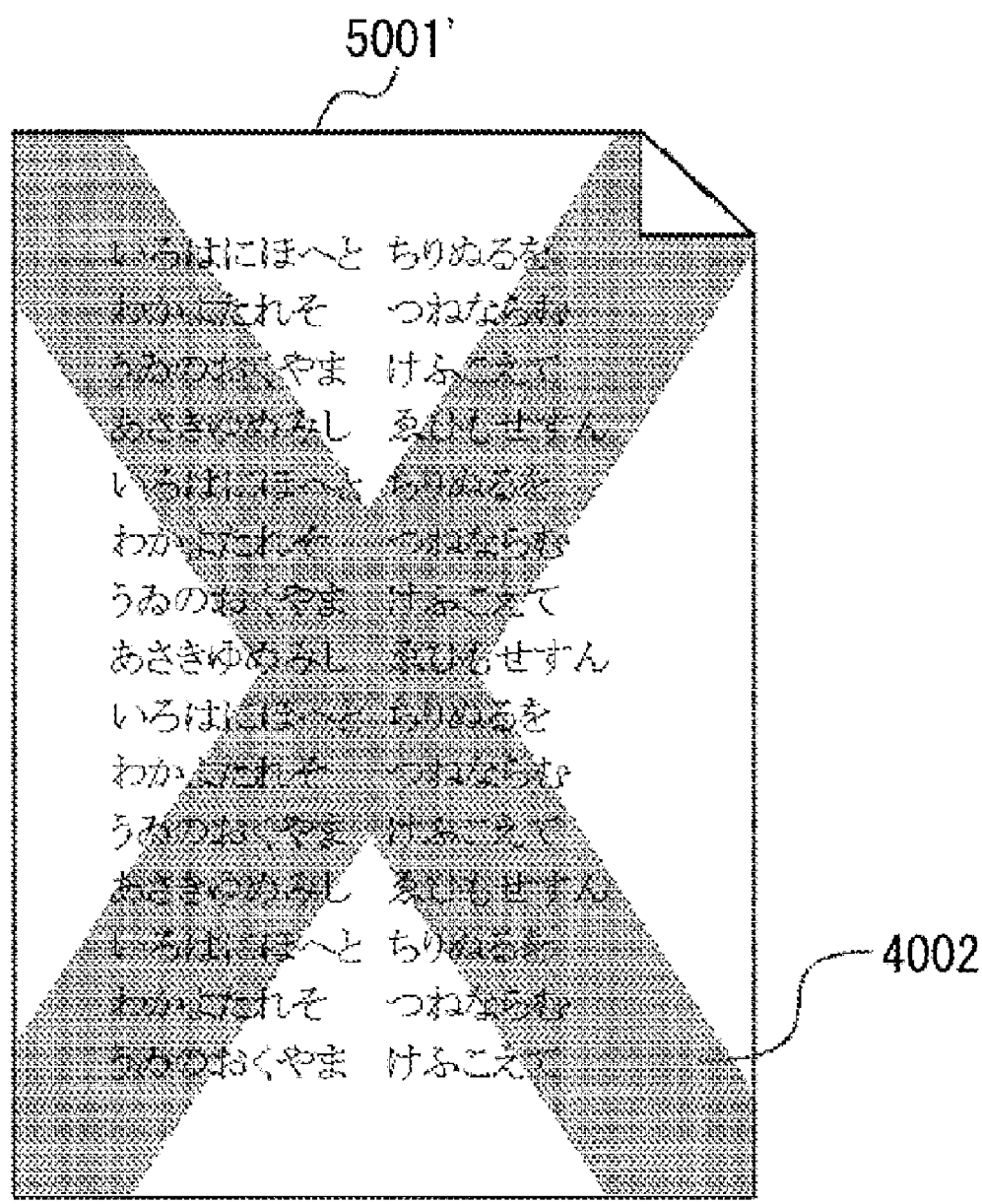
FIG. 4 illustrates that a latent image emerges.
Figure 5:
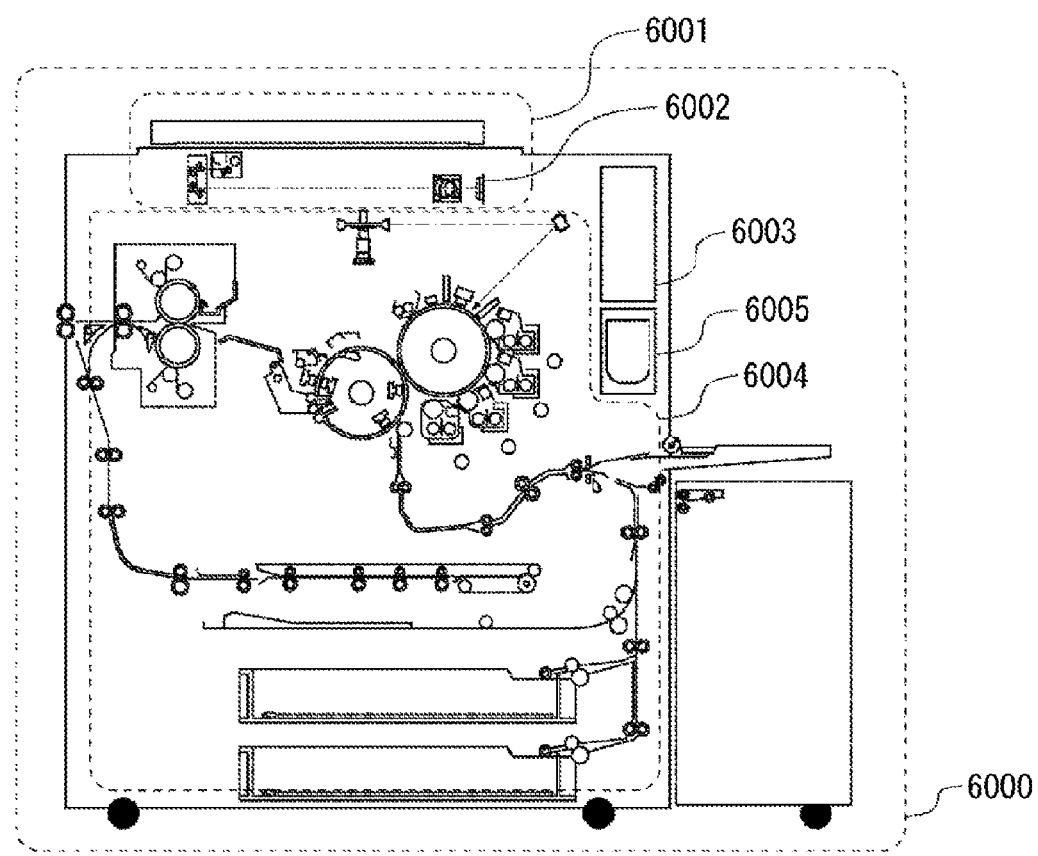
FIG. 5 illustrates a configuration of a copying machine.
Figure 6:
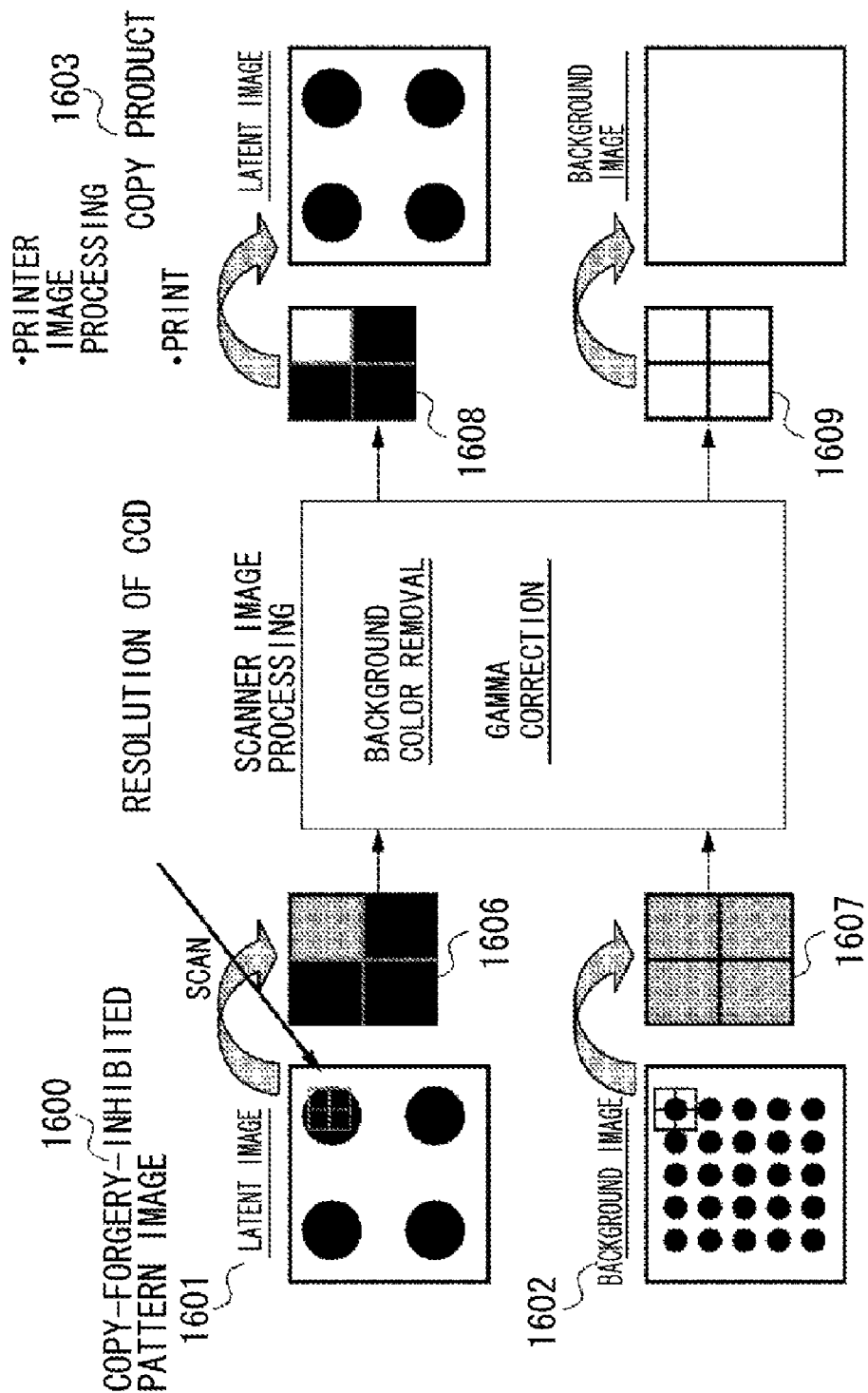
FIG. 6 illustrates a process for obtaining a copy product by scanning a print product, which includes a copy-forgery-inhibited pattern image, with a CCD having a resolution of 600 dpi.
Figure 8A:
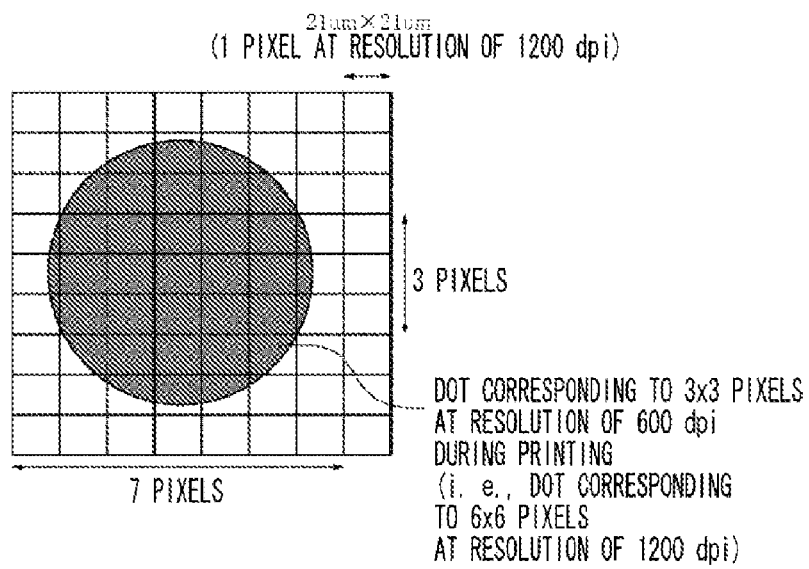
FIG. 8A illustrates that in a read image obtained by reading a print product, on which a large dot exists, with an image reading device, a region of 3×3 pixels centered at a central point of the large dot is very dark, and an area outside a region of 7×7 pixels centered at the central point of the large dot is very light.

FIG. 8A illustrates that in a read image obtained by reading a print product, on which a large dot exists, with an image reading device, a region of 3×3 pixels centered at a central point of the large dot is very dark, and an area outside a region of 7×7 pixels centered at the central point of the large dot is very light.

The expression "very dark" means that a luminance value is equal to or lower than 30 in a case where luminance values are set within a range of 0 to 255. The expression "very light" means that a luminance value is equal to or higher than 250 in a case where luminance values are set within a range of 0 to 255. However, the size of the region according to the present embodiment is not limited to 3×3 pixels and 7×7 pixels. Additionally, the luminance value of the region according to the present embodiment is not limited to 30 and 250. A designer can appropriately determine the size and the luminance value of the region.

In step S10003, the image processing apparatus 6003 determines a position at which each small dot exists in the read image. The determination of such a position can be performed according to a luminance value of each pixel that exists in the read image.

More specifically, in step S10003, the image processing apparatus 6003 determines a central position of a region of 1×1 pixel as a position of each small dot in a case where the region of 1×1 pixel is very dark and where an area outside a region of 3×3 pixels concentric with the region of 1×1 pixel is very light. This is because of the facts that generally, each of small dots of a copy-forgery-inhibited pattern image is formed on a print product to have a size of 1×1 pixel or so at a resolution of 600 dpi (i.e., a size of 2×2 pixels or so at a resolution of 1200 dpi), and that in a case where a dot having a size of 2×2 pixels is scanned, generally, a region of 1×1 pixel is recognized to be very dark, while an area outside a concentric region of 3×3 pixels is recognized to be very light.

Figure 9A:
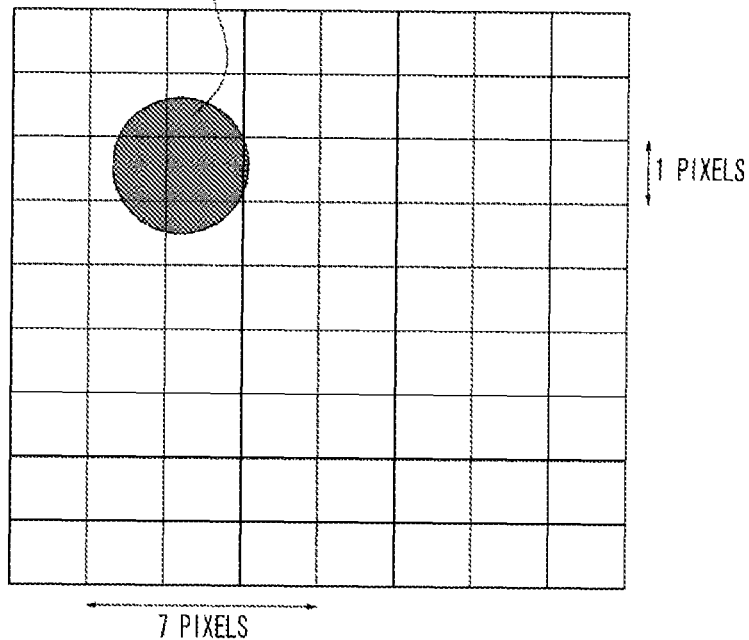
FIG. 9A illustrates that in a read image obtained by reading a print product, on which a small dot exists, with an image reading device, a region of 1×1 pixel centered at a central point of the small dot is very dark, and an area outside a region of 3×3 pixels centered at the central point of the small dot is very light.

FIG. 9A illustrates that in a read image obtained by reading a print product, on which a small dot exists, with an image reading device, a region of 1×1 pixel centered at a central point of the small dot is very dark, and an area outside a region of 3×3 pixels centered at the central point of the small dot is very light.

However, the size of the region according to the present embodiment is not limited to 1×1 pixel and 3×3 pixels. A designer can appropriately determine the size of the region.

In step S10004, the image processing apparatus 6003 determines whether there is a region in which large dots consecutively exist in both vertical and horizontal directions. If there is no such a region (NO in step S10004), the image processing apparatus 6003 determines that there is no copy-forgery-inhibited pattern image on the print product. Then, the processing proceeds to step S10009 (corresponding to normal processing). If there is such a region (YES in step S10004), the image processing apparatus 6003 determines that there is a copy-forgery-inhibited pattern image on the print product and identifies at least one region in which large dots consecutively exist. Then, the processing proceeds to step S10005. In the context of the present specification, a region in which large dots consecutively exist is referred to as a large dot region. A region in which small dots consecutively exist is referred to as a small dot region.

According to the present exemplary embodiment, a large dot region, i.e., a region in which large dots consecutively exist, meets the following conditions (1) to (3).

(1) Large dots included in the region adjoin each other. That is, no other dots exist between a central point of one of such large dots and that of the other of such large dots.

Figure 8B:
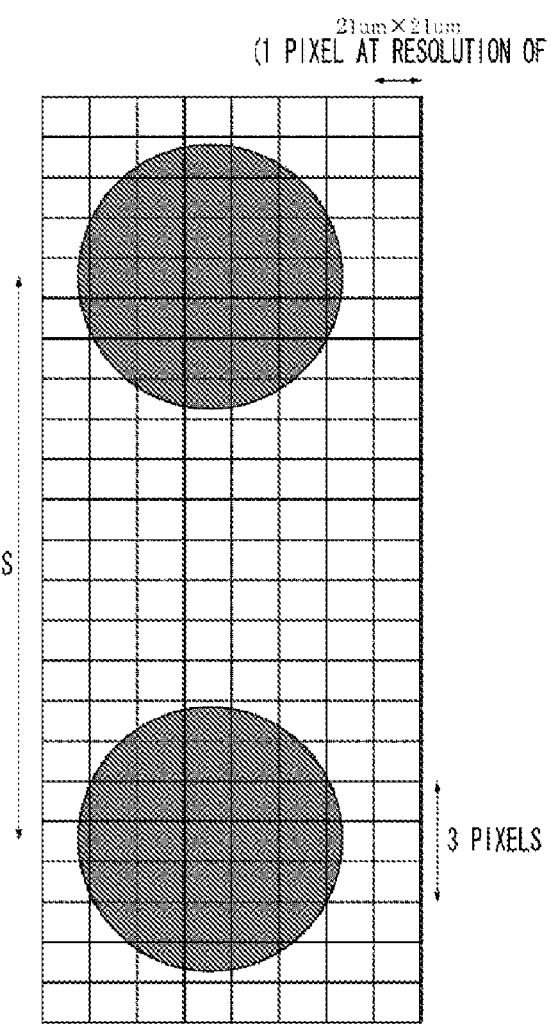
FIG. 8B illustrates adjacent large dots.

(2) A distance between adjacent large dots included in the region is equal to a predetermined distance or so. More specifically, a distance between a central point of one of the adjacent large dots and that of the other large dot is equal to or larger than a short threshold value (e.g., 10 pixels) and is smaller than a long threshold value (e.g., 20 pixels). A designer can appropriately determine these threshold values. FIG. 8B illustrates that the distance between the central points of large dots of a typically generated copy-forgery-inhibited pattern image is about 14 pixels.

(3) A predetermined number or more of adjacent ones of large dots included in the region, which are separately formed at a predetermined distance or so, consecutively exist in both vertical and horizontal directions. That is, a predetermined number (e.g., 3×3) or more of large dots satisfy the conditions (1) and (2).

According to an embodiment, a region satisfying the above conditions (1) to (3) is defined as the "region in which large dots consecutively exist".

When identifying at least one region in which large dots consecutively exist in step S10004, the image processing apparatus 6003 identifies a region that includes large dots which meet the conditions (1) and (2) and that is largest in the number of such large dots, as compared with any other regions that include such large dots.

For example, in a case where there are a region, in which 5×5 large dots consecutively exist, and another region, in which 3×3 large dots consecutively exist, the image processing apparatus 6003 identifies the region in which 5×5 large dots consecutively exist in step S10004.

In step S10005, the image processing apparatus 6003 determines whether there is a region in which small dots consecutively exist. If there is not such a region (NO in step S10005), no small dot region exists in the read image, although a copy-forgery-inhibited pattern image exists on the print product. Thus, even when normal processing is performed on the read image, a difference between the print product and a copy product is apparent to human eyes. Accordingly, if there is no small dot region (NO in step S10005), the processing proceeds to step S10009 (corresponding to normal processing). On the other hand, if there is a small dot region (YES in step S10005), the image processing apparatus 6003 identifies at least one small dot region. Then, the processing proceeds to step S10006.

According to the present exemplary embodiment, a small dot region, i.e., a region in which small dots consecutively exist, meets the following conditions (1)' to (3)'.

(1)' Small dots included in the region adjoin each other. That is, no other dots exist between a central point of one of such small dots and that of the other of such small dots.

Figure 9B:
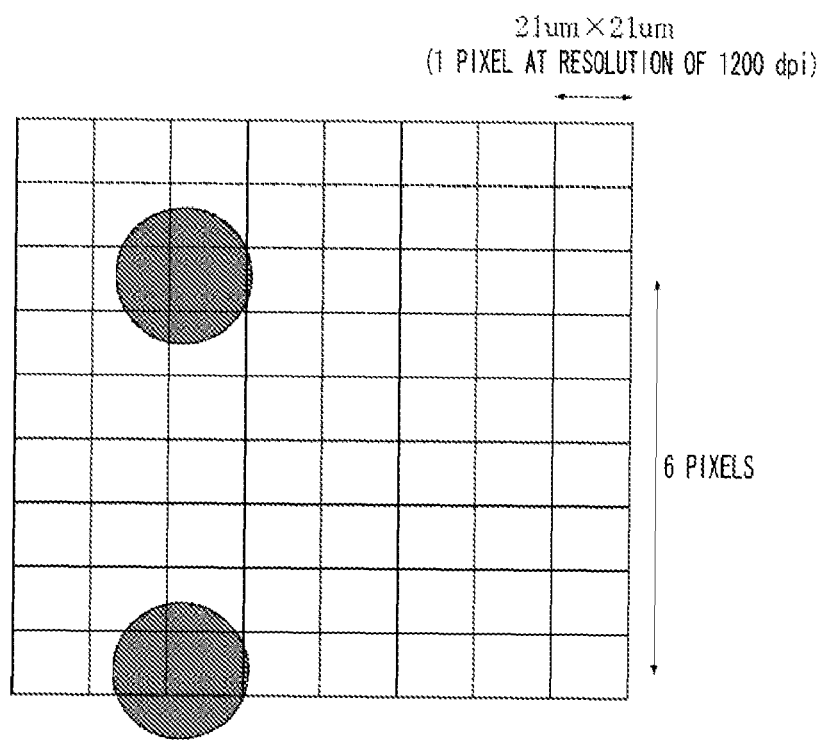
FIG. 9B illustrates adjacent small dots.

(2)' A distance between adjacent small dots included in the region is equal to a predetermined distance or so. More specifically, a distance between a central point of one of the adjacent small dots and that of the other small dot is equal to or larger than a short threshold value (e.g., 4 pixels) and is smaller than a long threshold value (e.g., 8 pixels). A designer can properly determine these threshold values. FIG. 9B illustrates that the distance between the central points of small dots of a typically generated copy-forgery-inhibited pattern image is about 6 pixels.

(3)' A predetermined number or more of adjacent ones of small dots included in the region, which are separately formed at a predetermined distance or so, consecutively exist in both vertical and horizontal directions. That is, a predetermined number (e.g., 9×9) or more of small dots satisfy the conditions (1)' and (2)'.

According to an embodiment, a region satisfying the above conditions (1)' to (3)' is defined as the "region in which small dots consecutively exist".

When identifying at least one region in which small dots consecutively exist in step S10005, the image processing apparatus 6003 identifies a region that includes small dots which meet the conditions (1)' and (2)' and that is largest in the number of such small dots, as compared with any other regions that include such small dots.

For example, in a case where there are a region, in which 15×15 small dots consecutively exist, and another region, in which 10×10 small dots consecutively exist, the image processing apparatus 6003 identifies the region in which 15×15 small dots consecutively exist in step S10005.

In step S10006, the image processing apparatus 6003 calculates a luminance value of a large dot region and that of a small dot region. The present exemplary embodiment employs an average luminance value of a large dot region as the luminance value of a large dot region. However, the luminance value of a large dot region according to the present exemplary embodiment is not limited to the average luminance value of a large dot region. A value corresponding to the average luminance value of a large dot region can be employed as the luminance value of a large dot region. For example, a weighted average luminance value of a large dot region, which is obtained by varying a weight with pixels, can be employed as the luminance value of a large dot region. This can also apply to the luminance value of a small dot region.

Figure 12:
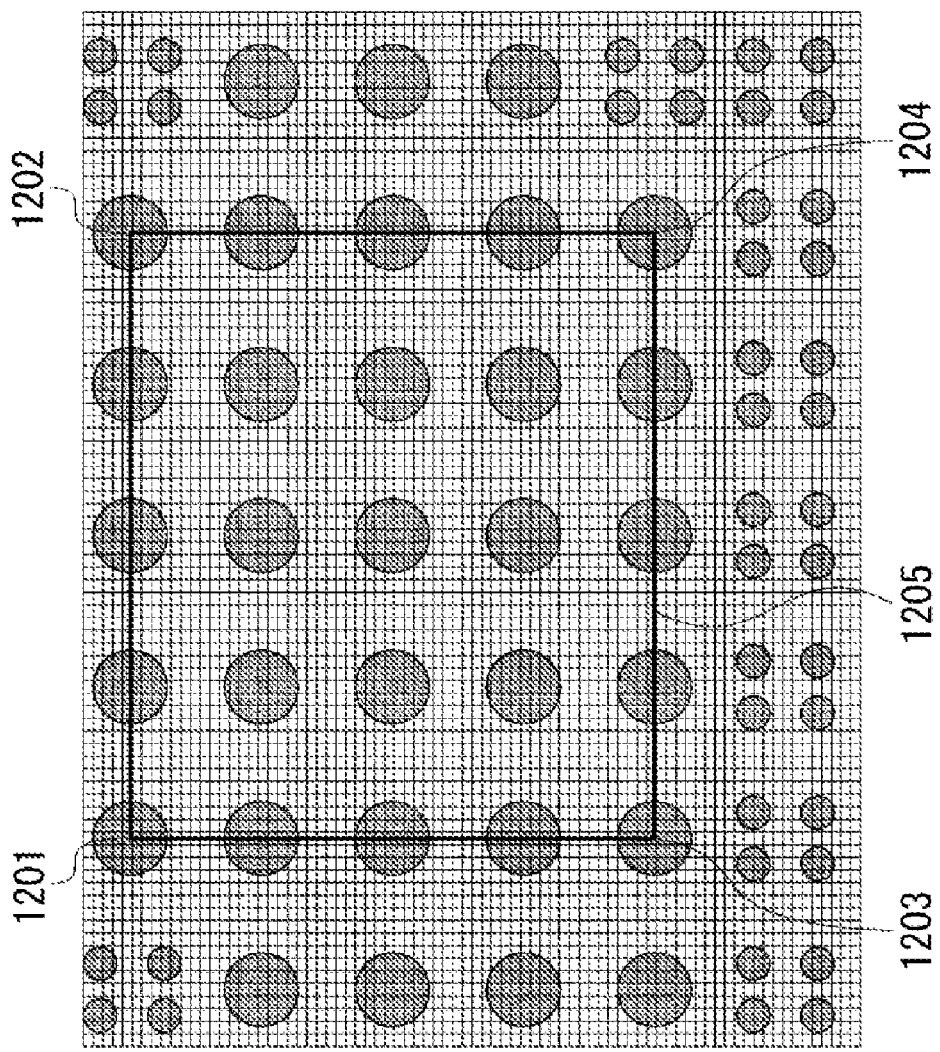
FIG. 12 illustrates a method for calculating an average luminance of a large dot region.

A method for calculating an average luminance value of a large dot region is described below. First, the image processing apparatus 6003 determines four large dots such that, when central points of the four large dots are serially connected with lines, no dots other than large dots are included in a region defined by the lines connecting the four large dots. More specifically, for example, as illustrated in FIG. 12, the image processing apparatus 6003 defines a region in which no dots other than large dots are included with lines 1205 connecting the central points of four large dots 1201, 1202, 1203, and 1204 included in a large dot region. The image processing apparatus 6003 obtains an average luminance value of the large dot region by calculating an average of luminance values at all pixels included in the region defined by the connected lines 1205.

An average luminance value of a small dot region is similarly calculated. More specifically, the image processing apparatus 6003 determines four small dots such that, when central points of the four small dots are serially connected with lines, no dots other than small dots are included in a region defined by the lines connecting the four small dots. Then, the image processing apparatus 6003 obtains an average luminance value of a small dot region by calculating an average of luminance values at all pixels included in the region defined by the connected lines.

A method of forming a region used at calculation of the average luminance value according to the present embodiment is not limited to the above-described method.

In step S10007, the image processing apparatus 6003 determines whether a difference in luminance value between a large dot region and a small dot region is equal to or greater than a threshold value. Although this threshold value is 50 according to the present exemplary embodiment, a designer can appropriately determine the threshold value. If the difference in luminance value between the large dot region and the small dot region is equal to or greater than the threshold value, a difference between the large dot region and the small dot region is conspicuous. Thus, even when normal processing is performed on the read image, a difference between the print product and a copy product is conspicuous. Accordingly, even when normal processing is performed, the intended purpose of a copy-forgery-inhibited pattern image can be achieved. Consequently, if the difference in luminance value between the large dot region and the small dot region is equal to or greater than the threshold value (YES in step S10007), the processing proceeds to step S10009 (corresponding to normal processing). On the other hand, if the difference in luminance value between the large dot region and the small dot region is less than the threshold value (NO in step S10007), the processing proceeds to step S10008 (corresponding to special processing).

Next, the normal processing and the special processing are described below.

Case 1 in which Copying Process is Instructed

FIG. 10 illustrates an operation performed in a case where a scan image is sent from the image reading device 6001 to the image processing apparatus 6003 after a user presses a start button subsequently to placement of a print product on a document positioning plate.

However, FIG. 10 does not illustrate what process is instructed when a user presses the start button. Thus, hereinafter, a description is made on processing to be performed in a case where a copying process is instructed when a user presses the start button.

In this case, normal processing performed by the CPU of the image processing apparatus 6003 is the following processing. That is, first, the CPU temporarily stores a read image in the storage unit 6005. Subsequently, the CPU reads the stored read image. Then, the CPU performs printer image processing on the read image. The CPU outputs the processed image to the printer 6004. Consequently, the CPU enables or allows printing using the read image.

On the other hand, special processing is the following processing. That is, first, the CPU temporarily stores a read image in the storage unit 6005. Subsequently, the CPU deletes the stored read image from the storage unit 6005. Thus, the CPU does not output the read image to the printer 6004. Consequently, the CPU disables or inhibits printing using the read image.

Accordingly, even in a case where the difference in luminance value between a large dot region and a small dot region in a read image is small, the above-described special processing can prevent a copy product, which may be mistaken for an original that includes a copy-forgery-inhibited pattern image, from being generated from an image obtained by reading the original.

Case 2 in which Copying Process is Instructed

The special processing to be performed in Case 1, in which a copying process is instructed, is to inhibit printing using the read image. On the other hand, special processing to be performed in Case 2, in which a copying process is instructed, is to allow printing using the read image after special image processing is performed, instead of inhibiting printing using the read image. The special image processing is not performed in a normal processing mode. The special image processing includes an inhibiting-image combining process or an image-quality degrading process.

Figure 11:
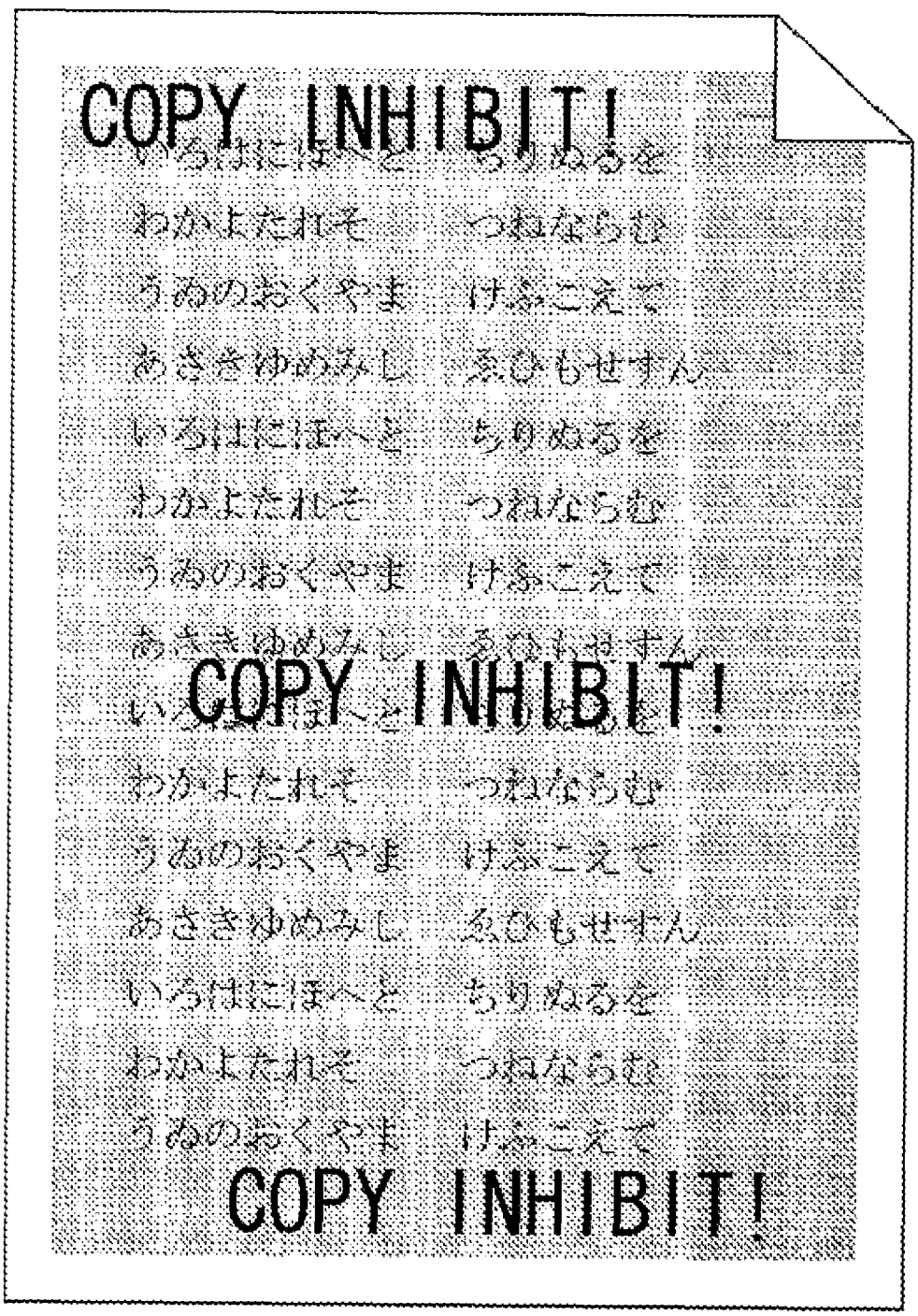
FIG. 11 illustrates a copy product obtained by combining a read image with a inhibiting image as special processing, then, performing printer image processing on a combined image, and printing the processed image on a sheet.

FIG. 11 illustrates an image obtained by combining an inhibiting image, which represents "COPY INHIBIT!" and does not relate to a copy-forgery-inhibited pattern image, with a read image.

Consequently, even in a case where the difference in luminance value between a large dot region and a small dot region in a read image is small, this special processing can prevent a copy product, which may be mistaken for an original that includes a copy-forgery-inhibited pattern image, from being generated from an image obtained by reading the original. Accordingly, a copy product that can be clearly distinguished from an original can be generated.

Case 1 in which Storing Process is Instructed

As described above, FIG. 10 illustrates an operation performed in a case where a scan image is sent from the image reading device 6001 to the image processing apparatus 6003 after a user presses the start button subsequently to placement of a print product on a document positioning plate.

However, as described above, FIG. 10 does not illustrate what process is instructed when a user presses the start button. Thus, hereinafter, a description is made on processing to be performed in a case where a storing process is instructed when a user presses the start button.

In this case, normal processing performed by the CPU of the image processing apparatus 6003 is the following processing. That is, first, the CPU temporarily stores a read image in the storage unit 6005. Subsequently, the CPU stands by. The read image is stored in the storage unit 6005 until the CPU reads the stored read image from the storage unit 6005 to send the read image to another apparatus or until the CPU receives a print instruction from a user. Consequently, the CPU enables or allows storing the read image.

On the other hand, special processing is the following processing. That is, the CPU stands by without storing a read image in the storage unit 6005. Thus, the CPU disables or inhibits storing the read image. In the context of the present specification, the expression "stands by without storing" includes an operation of once storing the read image and immediately deleting the stored image.

Consequently, even in a case where the difference in luminance value between a large dot region and a small dot region in a read image is small, this special processing can prevent a copy product, which may be mistaken for an original that includes a copy-forgery-inhibited pattern image, from being generated from an image obtained by reading the original. Accordingly, a read image can be stored to later generate a copy product that can be clearly distinguished from the original.

Case 2 in which Storing Process is Instructed

The special processing to be performed in Case 1, in which a storing process is instructed, is to inhibit storing the read image. On the other hand, special processing to be performed in Case 2, in which a storing process is instructed, is to allow storing an image obtained using the read image after special image processing is performed on the read image, instead of inhibiting storing the read image. This special image processing is not performed in a normal processing mode. This special image processing includes an inhibiting-image combining process or an image-quality degrading process.

Consequently, even in a case where the difference in luminance value between a large dot region and a small dot region in a read image is small, this special processing can prevent a copy product, which may be mistaken for an original that includes a copy-forgery-inhibited pattern image, from being generated from an image obtained by reading the original.

Case 1 in which Sending Process is Instructed

As described above, FIG. 10 illustrates an operation performed in a case where a scan image is sent from the image reading device 6001 to the image processing apparatus 6003 after a user presses the start button subsequently to placement of a print product on a document positioning plate.

However, as described above, FIG. 10 does not illustrate what process is instructed when a user presses the start button. Thus, hereinafter, a description is made on processing to be performed in a case where a sending process is instructed when a user presses the start button.

In this case, normal processing performed by the CPU of the image processing apparatus 6003 is the following processing. That is, first, the CPU temporarily stores a read image in the storage unit 6005. Subsequently, the CPU reads the read image from the storage unit 6005 and sends the read image to another apparatus. Thus, the CPU enables or allows sending the read image.

On the other hand, special processing is the following processing. That is, the CPU stores a read image once in the storage unit 6005. However, the CPU does not read the read image from the storage unit 6005 to send the read image to another apparatus. Thus, the CPU disables or inhibits sending the read image.

Consequently, even in a case where the difference in luminance value between a large dot region and a small dot region in a read image is small, this special processing can prevent a copy product, which may be mistaken for an original that includes a copy-forgery-inhibited pattern image, from being generated by another apparatus from an image obtained by reading the original.

Case 2 in which Sending Process is Instructed

The special processing to be performed in Case 1, in which a sending process is instructed, is to inhibit sending the read image to another apparatus. On the other hand, special processing to be performed in Case 2, in which a sending process is instructed, is to allow sending an image obtained using the read image after special image processing is performed on the read image, instead of inhibiting sending the read image. This special image processing is not performed in a normal processing mode. This special image processing includes an inhibiting-image combining process or an image-quality degrading process.

Even in a case where the difference in luminance value between a large dot region and a small dot region in a read image is small, this special processing can prevent a copy product, which may be mistaken for an original that includes a copy-forgery-inhibited pattern image, from being generated by another apparatus from an image obtained by reading the original.

In the above-described exemplary embodiments, when a large dot region is identified in step S10004, and when a small dot region is identified in step S10005, the image processing apparatus 6003 identifies one large dot region, which is largest in the number of large dots satisfying the conditions (1) to (3), and one small dot region, which is largest in the number of small dots satisfying the conditions (1)' to (3)'. However, the number of large dot regions to be identified by the image processing apparatus 6003 according to the present invention is not limited to 1. Also, the number of small dot regions to be identified by the image processing apparatus 6003 according to the present invention is not limited to 1. For example, three large dot regions and three small dot regions can be identified by the image processing apparatus 6003 according to the present invention. In step S10006, the image processing apparatus 6003 can calculate a difference between an average of luminance values of the three large dot regions and that of luminance values of the three small dot regions.

Alternatively, in step S10006, the image processing apparatus 6003 can calculate a difference in luminance value between one of the three large dot regions, which has a highest luminance value, and one of the three small dot regions, which has a highest luminance value.

Alternatively, in step S10006, the image processing apparatus 6003 can calculate a difference in luminance value between one of the three large dot regions, which has a highest luminance value, and one of the three small dot regions, which has a lowest luminance value. The calculation of the difference in luminance value between the large dot region, which has a highest luminance value (lightest), and the small dot region, which has a lowest luminance value (densest), in step S10006 reduces the possibility that the difference in luminance value therebetween is determined in step S10007 to be equal to or greater than a threshold value. Thus, the possibility of causing the image processing apparatus 6003 to perform special processing in step S10008 is increased. Consequently, in step S10008, the special processing is performed with extremely high possibility on a print product if there is any possibility that a latent image of a copy-forgery-inhibited pattern image does not emerge on a copy product of the print product.

Alternatively, in step S10006, the image processing apparatus 6003 can calculate a difference in luminance value between one of the three large dot regions, which has a lowest luminance value, and one of the three small dot regions, which has a highest luminance value. The calculation of the difference in luminance value between one of the three large dot regions, which has a lowest luminance value (densest), and one of the three small dot regions, which has a highest luminance value (lightest), in step S10006 increases the possibility that the difference in luminance value therebetween is determined in step S10007 to be equal to or greater than the threshold value. Thus, the possibility of causing the image processing apparatus 6003 to perform normal processing in step S10009 is increased. Consequently, the possibility of occurrence of an erroneous determination can be reduced.

The present invention can be achieved by causing a computer (or CPU or micro processing unit (MPU)) of a system or an apparatus to read and execute program code stored in a storage medium which stores the program code for implementing the procedure illustrated in the flowcharts according to the above-described exemplary embodiments. In this case, the program code itself, which is read from the storage medium, implements the functions of the above-described exemplary embodiments, and thus the storage medium, which stores the program code, constitutes the present invention.

The storage medium for supplying the program code can be selected from among, e.g., a floppy disk, a hard disk, an optical disk, a magneto-optical disk, a compact disc read-only memory (CD-ROM), a compact disc-recordable (CD-R), a magnetic tape, a nonvolatile memory card, and a read-only memory (ROM).

In the above-described exemplary embodiments, the expressions, "luminance", "density", and "lightness" have been used. However, there is substantially no difference among the words "luminance", "density", and "lightness" in expressing a degree of brightness or darkness. Accordingly, processing to be performed can be changed by determining whether a density or lightness difference is equal to or greater (or less) than a threshold value, instead of determining whether a luminance difference is equal to or greater (or less) than a threshold value.

Additionally, in the present specification, the words, such as "density", "luminance", and "lightness", expressing a degree of brightness or darkness are collectively expressed as a "degree of brightness".

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-34341 filed Dec. 20, 2006, which is hereby incorporated by reference herein in its entirety.

What is claimed is:

1. An image processing apparatus comprising:
  image processing unit configured to perform image processing so as to make the color of a light portion lighter or white in an image obtained by reading an image on a sheet;
  identifying unit configured to identify a large dot region, in which large dots of a copy-forgery-inhibited pattern image consecutively exist, and a small dot region, in which small dots of a copy-forgery-inhibited pattern image consecutively exist, on a resulting image obtained after image processing by the image processing unit;
  determining unit configured to determine whether a difference between a degree of brightness of the large dot region identified by the identifying unit and a degree of brightness of the small dot region identified by the identifying unit is greater than or equal to a threshold value; and
  processing unit configured to prohibit printing using the resulting image when the determining unit determines that the difference is less than the threshold value, and to permit printing using the resulting image when the determining unit determines that the difference is greater than or equal to the threshold value.

2. An image processing apparatus comprising:
  image processing unit configured to perform image processing so as to make the color of a light portion lighter or white in an image obtained by reading an image on a sheet;
  identifying unit configured to identify a large dot region, in which large dots of a copy-forgery-inhibited pattern image consecutively exist, and a small dot region, in which small dots of a copy-forgery-inhibited pattern image consecutively exist, on a resulting image obtained after image processing by the image processing unit;
  determining unit configured to determine whether a difference between a degree of brightness of the large dot region identified by the identifying unit and a degree of brightness of the small dot region identified by the identifying unit is greater than or equal to a threshold value; and
  processing unit configured to, when the determining unit determines that the difference is less than the threshold value, perform printing after performing image processing, which is not performed when the determining unit determines that the difference is greater than or equal to the threshold value, on the resulting image.

3. An image processing apparatus comprising:

image processing unit configured to perform image processing so as to make the color of a light portion lighter or white in an image obtained by reading an image on a sheet;

identifying unit configured to identify a large dot region, in which large dots of a copy-forgery-inhibited pattern image consecutively exist, and a small dot region, in which small dots of a copy-forgery-inhibited pattern image consecutively exist, on a resulting image obtained after image processing by the image processing unit;

determining unit configured to determine whether a difference between a degree of brightness of the large dot region identified by the identifying unit and a degree of brightness of the small dot region identified by the identifying unit is greater than or equal to a threshold value; and processing unit configured to prohibit storage of the resulting image when the determining unit determines that the difference is less than the threshold value, and to permit storage of the read image when the determining unit determines that the difference is greater than or equal to the threshold value.

4. An image processing apparatus comprising:

image processing unit configured to perform image processing so as to make the color of a light portion lighter or white in an image obtained by reading an image on a sheet;

identifying unit configured to identify a large dot region, in which large dots of a copy-forgery-inhibited pattern image consecutively exist, and a small dot region, in which small dots of a copy-forgery-inhibited pattern image consecutively exist, on a resulting image obtained after image processing by the image processing unit;

determining unit configured to determine whether a difference between a degree of brightness of the large dot region identified by the identifying unit and a degree of brightness of the small dot region identified by the identifying unit is greater than or equal to a threshold value; and processing unit configured to, when the determining unit determines that the difference is less than the threshold value, store the resulting image after performing image processing, which is not performed when the determining unit determines that the difference is greater than or equal to the threshold value, on the resulting image.

5. An image processing apparatus comprising:

image processing unit configured to perform image processing so as to make the color of a light portion lighter or white in an image obtained by reading an image on a sheet;

identifying unit configured to identify a large dot region, in which large dots of a copy-forgery-inhibited pattern image consecutively exist, and a small dot region, in which small dots of a copy-forgery-inhibited pattern image consecutively exist, on a resulting image obtained after image processing by the image processing unit;

determining unit configured to determine whether a difference between a degree of brightness of the large dot region identified by the identifying unit and a degree of brightness of the small dot region identified by the identifying unit is greater than or equal to a threshold value; and processing unit configured to prohibit transmission of the resulting image to anther apparatus when the determining unit determines that the difference is less than the threshold value, and to permit transmission of the resulting image to anther apparatus when the determining unit determines that the difference is greater than or equal to the threshold value.

6. An image processing apparatus comprising:

image processing unit configured to perform image processing so as to make the color of a light portion lighter or white in an image obtained by reading an image on a sheet;

identifying unit configured to identify a large dot region, in which large dots of a copy-forgery-inhibited pattern image consecutively exist, and a small dot region, in which small dots of a copy-forgery-inhibited pattern image consecutively exist, on a resulting image obtained after image processing by the image processing unit;

determining unit configured to determine whether a difference between a degree of brightness of the large dot region identified by the identifying unit and a degree of brightness of the small dot region identified by the identifying unit is greater than or equal to a threshold value; and processing unit configured to, when the determining unit determines that the difference is less than the threshold value, transmit the resulting image after performing image processing, which is not performed when the determining unit determines that the difference is greater than or equal to the threshold value, on the resulting image.

7. An image processing apparatus comprising:

image processing unit configured to perform image processing so as to make the color of a light portion lighter or white in an image obtained by reading an image on a sheet;

identifying unit configured to identify a large dot region, in which large dots of a copy-forgery-inhibited pattern image consecutively exist, and a small dot region, in which small dots of a copy-forgery-inhibited pattern image consecutively exist, on a resulting image obtained after image processing by the image processing unit;

determining unit configured to determine whether a difference between a degree of brightness of the large dot region identified by the identifying unit and a degree of brightness of the small dot region identified by the identifying unit is greater than or equal to a threshold value; and processing unit configured to, when the determining unit determines that the difference is less than the threshold value, perform processing, which is different from processing performed when the determining unit determines that the difference is greater than or equal to the threshold value, on the resulting image, wherein the identifying unit identifies the large dot region and the small dot region by discriminating continuity of dots that exist in the read image.

8. A control method for an image processing apparatus, the control method comprising:

image processing unit configured to perform image processing so as to make the color of a light portion lighter or white in an image obtained by reading an image on a sheet;

an identifying step of identifying a large dot region, in which large dots of a copy-forgery-inhibited pattern image consecutively exist, and a small dot region, in which small dots of a copy-forgery-inhibited pattern image consecutively exist, on a resulting image obtained after image processing by the image processing unit;

a determining step of determining whether a difference between a degree of brightness of the large dot region identified by the identifying unit and a degree of brightness of the small dot region identified in the identifying step is greater than or equal to a threshold value; and a processing step of prohibiting printing using the resulting image when it is determined in the determining step that the difference is less than the threshold value, and of permitting printing using the resulting image when it is determined in the determining step that the difference is greater than or equal to the threshold value.

9. A computer-readable medium having stored thereon, a program that causes an image processing apparatus to perform a control method according to claim 8.

* * * * *